United States Patent
Morishita et al.

(10) Patent No.: US 10,203,579 B2
(45) Date of Patent: Feb. 12, 2019

(54) LIQUID CRYSTAL DISPLAY DEVICE

(71) Applicant: SHARP KABUSHIKI KAISHA, Sakai, Osaka (JP)

(72) Inventors: Katsuhiko Morishita, Sakai (JP); Kumi Furukawa, Sakai (JP); Shogo Nishiwaki, Sakai (JP); Masahiko Kondoh, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/557,063

(22) PCT Filed: Mar. 2, 2016

(86) PCT No.: PCT/JP2016/056370
§ 371 (c)(1),
(2) Date: Sep. 8, 2017

(87) PCT Pub. No.: WO2016/143621
PCT Pub. Date: Sep. 15, 2016

(65) Prior Publication Data
US 2018/0081216 A1 Mar. 22, 2018

(30) Foreign Application Priority Data
Mar. 9, 2015 (JP) .................................. 2015-046448

(51) Int. Cl.
*G02F 1/1368* (2006.01)
*G02F 1/1339* (2006.01)
(Continued)

(52) U.S. Cl.
CPC .......... *G02F 1/1368* (2013.01); *G02F 1/1339* (2013.01); *G02F 1/13394* (2013.01);
(Continued)

(58) Field of Classification Search
CPC .. G02F 1/1343; G02F 1/1333; G02F 1/13394; G02F 1/1339; G02F 1/1368;
(Continued)

(56) References Cited

U.S. PATENT DOCUMENTS 9,638,971 B2 * 5/2017 Komatsu ........... G02F 1/136227
2015/0116644 A1 4/2015 Morishita et al.

FOREIGN PATENT DOCUMENTS

WO 2013/168566 A1 11/2013

OTHER PUBLICATIONS

International Search Report (PCT/JP2016/056370).

* cited by examiner

*Primary Examiner* — Thoi Duong
(74) *Attorney, Agent, or Firm* — ScienBiziP, P.C.

(57) ABSTRACT

A liquid crystal display device includes a counter substrate and an active matrix substrate, and a liquid crystal layer that is provided between the counter substrate and the active matrix substrate. The active matrix substrate includes gate interconnect lines, data interconnect lines, a thin film transistor, a pixel electrode that is connected to the thin film transistor via a through hole, a common electrode, and an interlayer insulating layer that is disposed between the pixel electrode and the common electrode. Also, a photo spacer for providing a constant spacing between the counter substrate and the active matrix substrate is provided inside the liquid crystal layer, and equipotential lines having a voltage less than a threshold value are formed inside the photo spacer.

6 Claims, 12 Drawing Sheets

(51) Int. Cl.
 *G02F 1/1343* (2006.01)
 *G02F 1/1335* (2006.01)
(52) U.S. Cl.
 CPC .. *G02F 1/134336* (2013.01); *G02F 1/133602* (2013.01); *G02F 2001/13398* (2013.01); *G02F 2001/134372* (2013.01)
(58) Field of Classification Search
 CPC ............ G02F 1/134363; G02F 1/1362; G02F 1/136227; G02F 1/136286; G02F 1/134309; G02F 1/134336; G02F 1/1337; G02F 1/133707; G02F 2001/13398; G02F 2001/134318; G02F 2001/134372; H01L 27/124; H01L 27/3262
 See application file for complete search history.

LIQUID CRYSTAL DISPLAY DEVICE

TECHNICAL FIELD

The present invention relates to a liquid crystal display device. In particular, the invention relates to a fringe field switching (FFS) mode liquid crystal display device in which horizontal electric fields are applied to a liquid crystal layer and a pixel electrode and a common electrode are provided with an interlayer insulating layer interposed therebetween.

BACKGROUND ART

In recent years, for example, liquid crystal display devices are widely used in liquid crystal television sets, monitors, mobile phones and the like as flat panel displays that are thinner and lighter in weight than the existing cathode ray tube displays. Such a liquid crystal display device includes: an illumination device (backlight device) that emits light; and a liquid crystal panel that includes a liquid crystal layer including liquid crystal molecules and a pair of substrates sandwiching the liquid crystal layer and that functions as a shutter with respect to light emitted from a light source provided in the illumination device and displays an intended image.

The liquid crystal display device as described above is known to have a control system such as, for example, a twisted nematic (TN) mode in which vertical electric fields are applied to the liquid crystal layer so as to control the alignment of the liquid crystal molecules contained in the liquid crystal layer, an in-plane switching (IPS) mode in which horizontal electric fields are applied to the liquid crystal layer so as to control the alignment of the liquid crystal molecules contained in the liquid crystal layer, or an FFS mode. In particular, more attention is paid to the FFS mode liquid crystal display device that has better viewing angle characteristics than a vertical electric field liquid crystal display device such as the TN mode liquid crystal display device and has a higher light transmittance than the IPS mode liquid crystal display device.

To be specific, as the conventional liquid crystal display device described above, Patent Document 1 listed below discloses a liquid crystal display device in which on an active matrix substrate (one of a pair of substrates) side on which a thin film transistor (TFT) that serves as a switching element is provided for each pixel, a pixel electrode that is connected to the thin film transistor is provided. Also, in the conventional liquid crystal display device, on the active matrix substrate side, a flat plate-like common electrode is provided so as to oppose the pixel electrode having comb-tooth portions, with an interlayer insulating layer interposed therebetween. The common electrode and the pixel electrode are made of a transparent electrode material. The common electrode is connected to a common interconnect line. In the conventional liquid crystal display device, based on a switching operation of the thin film transistor, fringing electric fields are formed between the common electrode and the pixel electrode so as to pass through the comb-tooth portions, and the alignment of the liquid crystal molecules contained in the liquid crystal layer is controlled by the fringing electric fields, and an image is thereby displayed.

PRIOR ART DOCUMENTS

Patent Document

Patent Document 1: WO 2013/168566

DISCLOSURE OF INVENTION

Problem to be Solved by the Invention

A liquid crystal display device is used as a display portion of a personal digital assistant such as a smartphone or a tablet. There is demand for a personal digital assistant that includes a display portion (liquid crystal display device) having a higher resolution.

However, a conventional liquid crystal display device as described above is problematic in that, when a high resolution is implemented, a white spot (pixel defect) occurs that emits brighter white light than normal pixels.

To be specific, in the conventional liquid crystal display device, inside the liquid crystal layer, a photo spacer (spacer) for providing a constant spacing between the pair of substrates is provided for every predetermined number of pixels. Then, as a result of the conventional liquid crystal display device in which a high resolution is implemented being subjected to, for example, a reliability test (long-term continuous operation test), a white spot originating from the photo spacer was observed during and/or after the reliability test.

In view of the problems described above, it is an object of the present invention to provide a liquid crystal display device that has high display quality and can prevent the occurrence of a white spot while implementing a high resolution.

Means for Solving Problem

In order to achieve the object described above, a liquid crystal display device according to the present invention is a liquid crystal display device including a pair of substrates and a liquid crystal layer that is provided between the pair of substrates, wherein one of the pair of substrates includes gate interconnect lines, data interconnect lines, a switching element, a pixel electrode that is connected to the switching element via a through hole, a common electrode, and an interlayer insulating layer that is disposed between the pixel electrode and the common electrode, a spacer for providing a constant spacing between the pair of substrates is provided inside the liquid crystal layer, and equipotential lines having a voltage less than a threshold value are formed inside the spacer.

In the liquid crystal display device configured as described above, the spacer is provided inside the liquid crystal layer. Furthermore, it was found that by forming equipotential lines having a voltage less than a threshold value inside the spacer, a parasitic capacitance on the spacer can be reduced. Also, this configuration can prevent the occurrence of a white spot while implementing a high resolution. The present invention has been made based on the finding described above, and can provide a liquid crystal display device that has high display quality and can prevent the occurrence of a white spot while implementing a high resolution.

Also, in the liquid crystal display device described above, in the spacer, a pixel electrode absent pattern in which the pixel electrode is not provided and that overlaps the spacer may be disposed so as to extend from a side surface of the through hole to a position on the interlayer insulating layer, and the equipotential lines having a voltage less than a threshold value may thereby be formed inside the spacer.

In this case, it is possible to reliably set the equipotential lines formed inside the spacer to a voltage less than a threshold value.

Also, in the liquid crystal display device described above, a predetermined distance or more may be set between a center of the spacer and a center of the through hole.

In this case, the spacer is spaced apart from the through hole that is an electrical connection area between the switching element and the pixel electrode by a predetermined distance or more, and it is therefore possible to more reliably set the equipotential lines formed inside the spacer to a voltage less than a threshold value.

Also, in the liquid crystal display device described above, the spacer may be configured to have a shape that does not overlap the through hole.

In this case, the spacer is configured to have a shape that does not overlap the through hole, and it is therefore possible to more reliably set the equipotential lines formed inside the spacer to a voltage less than a threshold value.

Also, in the liquid crystal display device described above, one of the pair of substrates may be configured such that the plurality of gate interconnect lines and the plurality of data interconnect lines are arranged in a matrix, and a pixel region is provided that is defined by two adjacent ones of the gate interconnect lines and two adjacent ones of the data interconnect lines and in which the switching element, the through hole, and the pixel electrode are disposed, and the spacer may be disposed inside the liquid crystal layer so as to extend across four pixel regions, each being said pixel region.

In this case, the spacing between the pair of substrates can be appropriately maintained by a plurality of spacers.

Also, in the liquid crystal display device described above, it is preferable that a pitch between two adjacent ones of the gate interconnect lines is set to a value within a range of 30 to 90 μm, and a pitch between two adjacent ones of the data interconnect lines is set to a value within a range of 10 to 30 μm.

In this case, it is possible to easily configure a liquid crystal display device in which a high resolution is implemented.

Effects of the Invention

According to the present invention, it is possible to provide a liquid crystal display device that has high display quality and can prevent the occurrence of a white spot while implementing a high resolution.

DESCRIPTION OF THE INVENTION

Hereinafter, preferred embodiments of the liquid crystal display device according to the present invention will be described with reference to the drawings. The following description will be given by taking an example in which the present invention is applied to a transmissive liquid crystal display device. Also, the dimensions of constituent members shown in the diagrams are not necessarily true to the actual dimensions of the constituent members and the actual dimensional ratio of the constituent members.

First Embodiment

Figure 1:
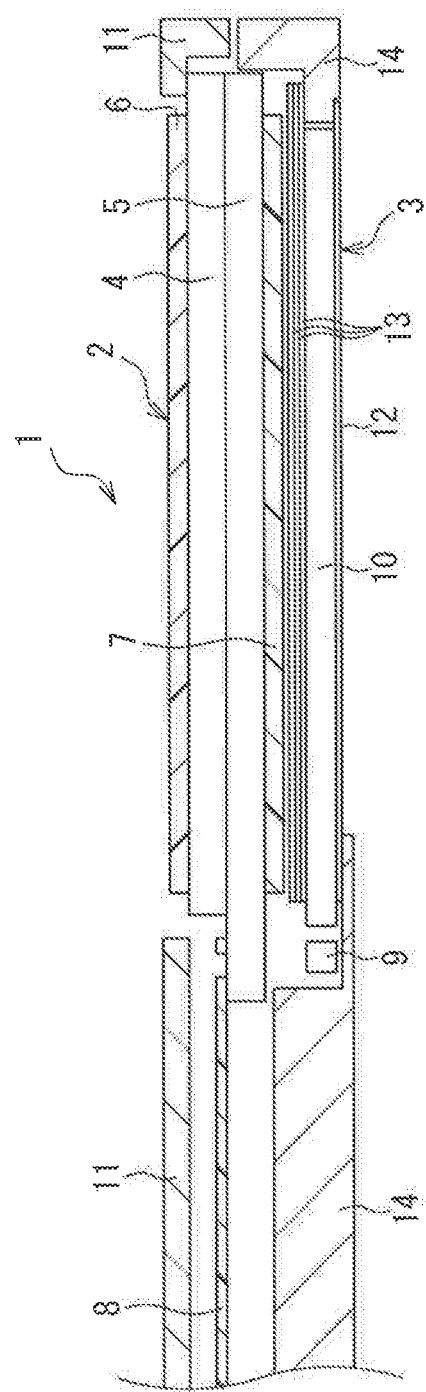
FIG. 1 is a diagram illustrating a liquid crystal display device according to a first embodiment of the present invention.

FIG. 1 is a diagram illustrating a liquid crystal display device according to a first embodiment of the present invention. In FIG. 1, a liquid crystal display device 1 according to the present embodiment includes: a liquid crystal panel 2 that is provided, with its display surface side to be viewed being on the upper side in FIG. 1; and a backlight device 3 that is disposed on a non-display surface side (the lower side in FIG. 1) of the liquid crystal panel 2 and emits illumination light that illuminates the liquid crystal panel 2.

The liquid crystal panel 2 includes a counter substrate 4 and an active matrix substrate 5 that constitute a pair of substrates, and polarizing plates 6 and 7 that are respectively provided on an outer surface of the counter substrate 4 and an outer surface of the active matrix substrate 5. A liquid crystal layer, which will be described later, is sandwiched between the counter substrate 4 and the active matrix substrate 5. Also, for the counter substrate 4 and the active matrix substrate 5, a transparent glass material or a transparent synthetic resin such as acrylic resin in the form of a flat plate is used. For the polarizing plates 6 and 7, resin films made of TAC (triacetyl cellulose) or PVA (polyvinyl alcohol) are used, and the polarizing plates 6 and 7 are adhesively attached to the counter substrate 4 and the active matrix substrate 5, respectively, so as to cover at least an effective display region on the display surface of the liquid crystal panel 2. A $\lambda/4$ phase difference plate (quarterwave retarder) may be provided between the polarizing plate 6 or 7 and the liquid crystal layer.

Also, the active matrix substrate 5 is one of the pair of substrates, and pixel electrodes, thin film transistors (TFTs), common electrodes, and the like are formed on the active matrix substrate 5 at a position between the active matrix substrate 5 and the liquid crystal layer according to the number of a plurality of pixels included in the display surface of the liquid crystal panel 2 (a detail thereof will be described later). On the other hand, the counter substrate 4 is the other substrate of the pair of substrates, and a color filter and the like are formed on the counter substrate 4 at a position between the counter substrate 4 and the liquid crystal layer (not shown).

Also, the liquid crystal panel 2 is provided with a FPC (flexible printed circuit) 8 that is connected to a control device (not shown) that drives and controls the liquid crystal panel 2, and as a result of the liquid crystal layer being operated on a pixel to pixel basis so as to drive the display surface on a pixel to pixel basis, an intended image is displayed on the display surface.

The backlight device 3 includes a light emitting diode 9 serving as a light source and a light guiding plate 10 that is disposed so as to oppose the light emitting diode 9. Also, in the backlight device 3, the light emitting diode 9 and the light guiding plate 10 are sandwiched between bezels 14 having an L shaped cross section, with the liquid crystal panel 2 being provided above the light guiding plate 10. Also, a case 11 is placed on the counter substrate 4. With this configuration, the backlight device 3 is combined with the liquid crystal panel 2 so as to integrally form the transmissive liquid crystal display device 1 in which illumination light from the backlight device 3 is incident on the liquid crystal panel 2.

For the light guiding plate 10, for example, a transparent synthetic resin such as acrylic resin is used, and the light guiding plate 10 receives light emitted from the light emitting diode 9. A reflective sheet 12 is provided on a side (opposite surface side) of the light guiding plate 10 that is opposite to the liquid crystal panel 2. Also, optical sheets 13 such as a lens sheet and a diffusing sheet are provided on the liquid crystal panel 2 side (light emission surface side) of the light guiding plate 10, and light that is emitted from the light emitting diode 9 and guided in a predetermined light guiding direction (the direction from the left side to the right side in FIG. 1) through the light guiding plate 10 is converted to planar illumination light having a uniform brightness level and then provided to the liquid crystal panel 2.

In the foregoing description, a configuration was described in which the edge-lit backlight device 3 including the light guiding plate 10 is used, but the present embodiment is not limited to this configuration, and a direct-lit backlight device may be used. It is also possible to use a backlight device including a light source other than a light emitting diode such as a cold cathode fluorescent tube or a hot cathode fluorescent tube.

Next, the liquid crystal panel 2 according to the present embodiment will be described specifically by also making reference to FIG. 2.

Figure 2:
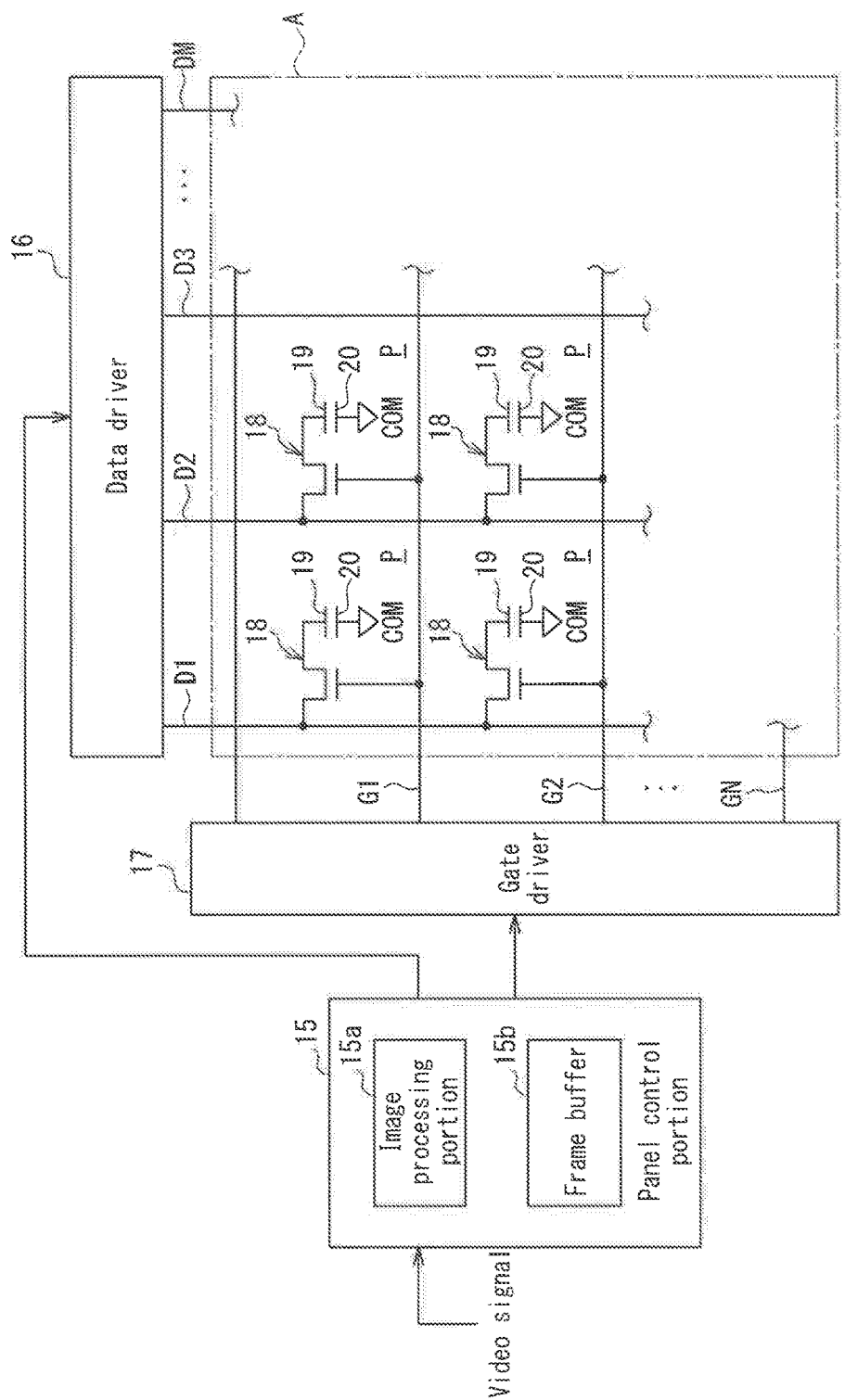
FIG. 2 is a diagram illustrating a configuration of a liquid crystal panel shown in FIG. 1

FIG. 2 is a diagram illustrating a configuration of the liquid crystal panel shown in FIG. 1.

In FIG. 2, the liquid crystal display device 1 (FIG. 1) includes a panel control portion 15 that drives and controls the liquid crystal panel 2 (FIG. 1) that serves as a display portion that displays information such as characters and images, and a data driver (source driver) 16 and a gate driver 17 that perform operation based on instruction signals from the panel control portion 15.

The panel control portion 15 is provided within the control device, and is configured to receive an input of a video signal provided from the outside of the liquid crystal display device 1. Also, the panel control portion 15 includes: an image processing portion 15a that performs predetermined image processing on the input video signal and generate an instruction signal for the data driver 16 and an instruction signal for the gate driver 17; and a frame buffer 15b that is capable of storing one frame's worth of display data included in the input video signal. In response to the input video signal, the panel control portion 15 drives and controls the data driver 16 and the gate driver 17, and information corresponding to the video signal is thereby displayed on the liquid crystal panel 2.

The data driver 16 and the gate driver 17 are provided on the active matrix substrate 5. To be specific, the data driver 16 is disposed on a surface of the active matrix substrate 5 so as to extend in a horizontal direction of the liquid crystal panel 2 in a region outside of an effective display region A of the liquid crystal panel 2 that serves as a display panel. Also, the gate driver 17 is disposed on the surface of the active matrix substrate 5 so as to extend in a vertical direction of the liquid crystal panel 2 in the region outside of the effective display region A. Furthermore, as will be described later in detail, the data driver 16 and the gate driver 17 are configured to be mounted on a terminal portion including a plurality of connection terminals provided on the active matrix substrate 5.

Also, the data driver 16 and the gate driver 17 are driving circuits that drive a plurality of pixels P that are provided on the liquid crystal panel 2 side on a pixel to pixel basis, and a plurality of data interconnect lines (source interconnect lines) D1 to DM (where M is an integer of 2 or more, and hereinafter collectively indicated by "D") are connected to the data driver 16, and a plurality of gate interconnect lines (scan interconnect lines) G1 to GN (where N is an integer of 2 or more, and hereinafter collectively indicated by "G") are connected to the gate driver 17. The data interconnect lines D and the gate interconnect lines G are arranged in a matrix so as to intersect each other on a substrate (described later) of the active matrix substrate 5, the substrate being made of a transparent glass material or a transparent synthetic resin. That is, the data interconnect lines D are provided on the substrate in parallel to a column direction of the matrix (the vertical direction of the liquid crystal panel 2), and the gate interconnect lines G are provided on the substrate in parallel to a row direction of the matrix (the horizontal direction of the liquid crystal panel 2).

Also, the plurality of pixels P, each including a thin film transistor 18 that serves as a switching element and a pixel electrode 19 that is connected to the thin film transistor 18, are provided near the intersections of the data interconnect lines D and the gate interconnect lines G. In each pixel P, a common electrode 20 is provided on the active matrix substrate 5 so as to oppose the pixel electrode 19.

On the active matrix substrate 5, as will be described later in detail, a plurality of pixel regions of the pixels P are formed in regions defined in a matrix by the data interconnect lines D and the gate interconnect lines G. The plurality of pixels P include red (R) pixels, green (G) pixels, and blue (B) pixels. R, G and B pixels that are arranged, for example, in this order are provided sequentially in parallel to the gate interconnect lines G1 to GN. Furthermore, the R, G and B pixels are configured to display their colors through the color filter layer that is provided on the counter substrate 4 side.

Also, on the active matrix substrate 5, the gate driver 17 sequentially outputs, to the gate interconnect lines G1 to GN, scan signals (gate signals) that turn on gate electrodes of the corresponding thin film transistors 18 based on an instruction signal from the image processing portion 15a. Also, the data driver 16 outputs data signals (voltage signals (gray scale voltages)) corresponding to the brightness level (gray scale) of the display image to the corresponding data interconnect lines D1 to DM, based on an instruction signal from the image processing portion 15a.

Next, an essential part of the liquid crystal display device 1 according to the present embodiment will be described specifically with reference to FIGS. 3, 4, and 5.

Figure 3:
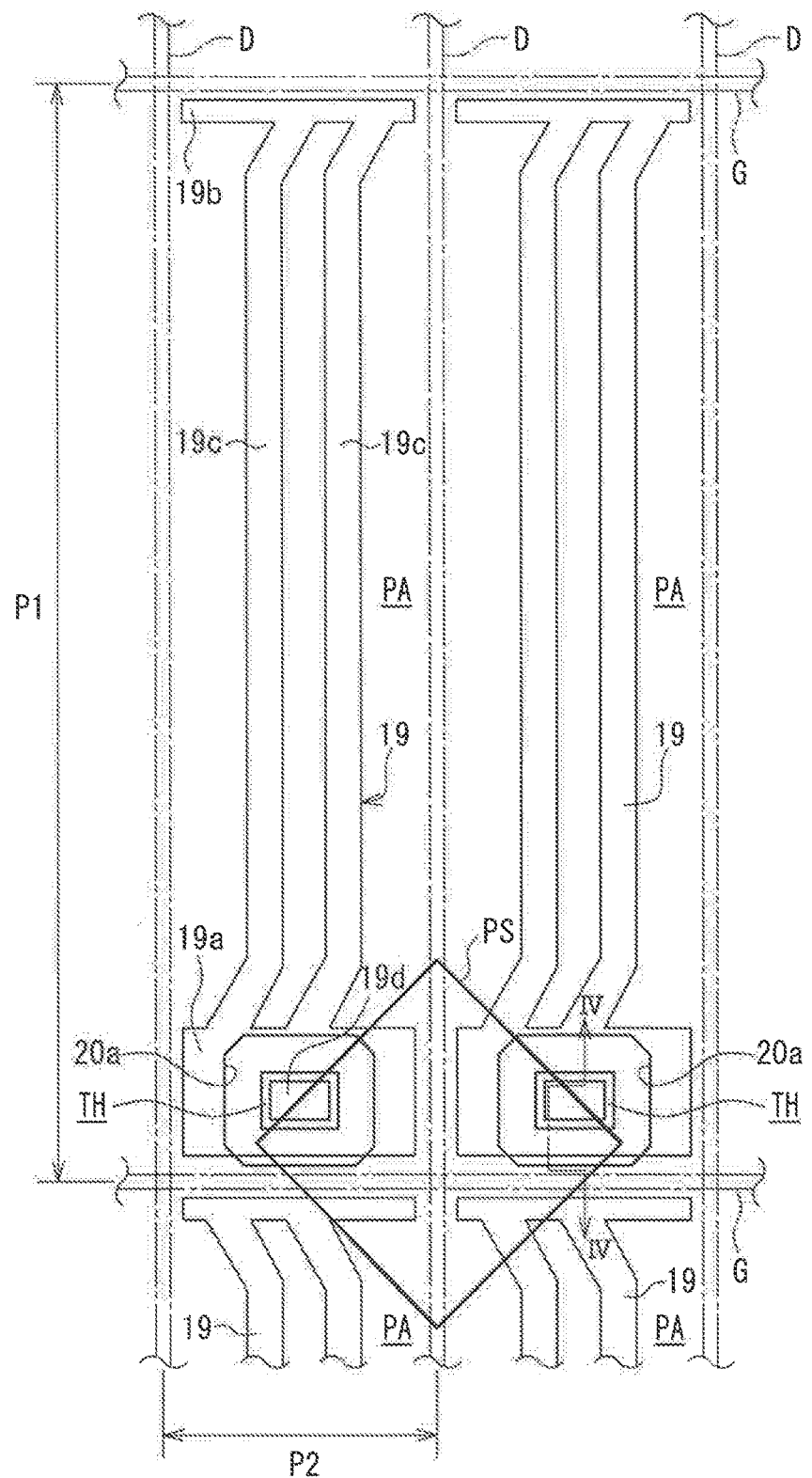
FIG. 3 is a plan view illustrating an essential part of the liquid crystal display device.

FIG. 3 is a plan view illustrating an essential part of the liquid crystal display device. FIG. 4 is a cross-sectional view taken along the line IV-IV shown in FIG. 3. FIG. 5 is a diagram illustrating a specific configuration of a through hole shown in FIG. 4. Note that, in FIGS. 3 and 4, for the sake of simplification of the drawings, the thin film transistor 18 is not illustrated.

As shown in FIG. 3, in the liquid crystal display device 1 according to the present embodiment, a pixel region PA of a pixel P is defined by two adjacent gate interconnect lines G and two adjacent data interconnect lines D, and in the pixel region PA, a thin film transistor 18 (FIG. 2), a pixel electrode 19, and a through hole TH are provided.

The liquid crystal display device 1 according to the present embodiment is configured as a display portion for use in, for example, a smartphone, and in the liquid crystal display device 1, the pitch (indicated by "P1" in FIG. 3) between two adjacent gate interconnect lines G is set to a value within a range of, for example, 30 to 90 μm, and the pitch (indicated by "P2" in FIG. 3) between two adjacent data interconnect lines D is set to a value within a range of, for example, 10 to 30 μm.

The gate electrodes (not shown) of the thin film transistors 18 are integrally formed with the gate interconnect lines G. In FIG. 4, the gate interconnect lines G and the gate electrodes (not shown) are formed between the active matrix substrate 5 and a first insulating film (gate insulating film) 22.

Also, for the gate interconnect lines G and the gate electrodes, for example, a molybdenum film, an aluminum film, a titanium film, a tungsten film, a tantalum film, a copper film, or an alloy film thereof is used, and the gate interconnect lines G and the gate electrodes are configured to, for example, be capable of being formed simultaneously in the same step.

Also, for the first insulating film 22, for example, silicon nitride (SiNx), silicon oxide ($SiO_2$), or the like is used.

Source electrodes (not shown) of the thin film transistors 18 are integrally formed with the data interconnect lines D. Also, in FIG. 4, the data interconnect lines D and the source electrodes (not shown) are formed between the first insulating film 22 and a second insulating film 23, and furthermore, drain electrodes of the thin film transistors 18 and a semiconductor layer (not shown) are formed between the first insulating film 22 and the second insulating film 23.

Also, for the data interconnect lines D, the source electrodes, and the drain electrodes, for example, a molybdenum film, an aluminum film, a titanium film, a tungsten film, a tantalum film, a copper film, or an alloy film thereof is used, and the data interconnect lines D, the source electrodes, and the drain electrodes are configured to, for example, be capable of being formed simultaneously in the same step.

Also, for the semiconductor layer, for example, amorphous silicon, polysilicon, microcrystalline silicon, or an oxide semiconductor is used. Furthermore, as the oxide semiconductor, an In—Ga—Zn—O amorphous oxide semiconductor that contains In, Ga and Zn in a ratio of 1:1:1 is preferably used.

Also, for the second insulating film 23, an organic film that is made of, for example, acrylic resin or the like, or an inorganic film that is made of silicon nitride (SiNx) or the like is used.

Figure 4:
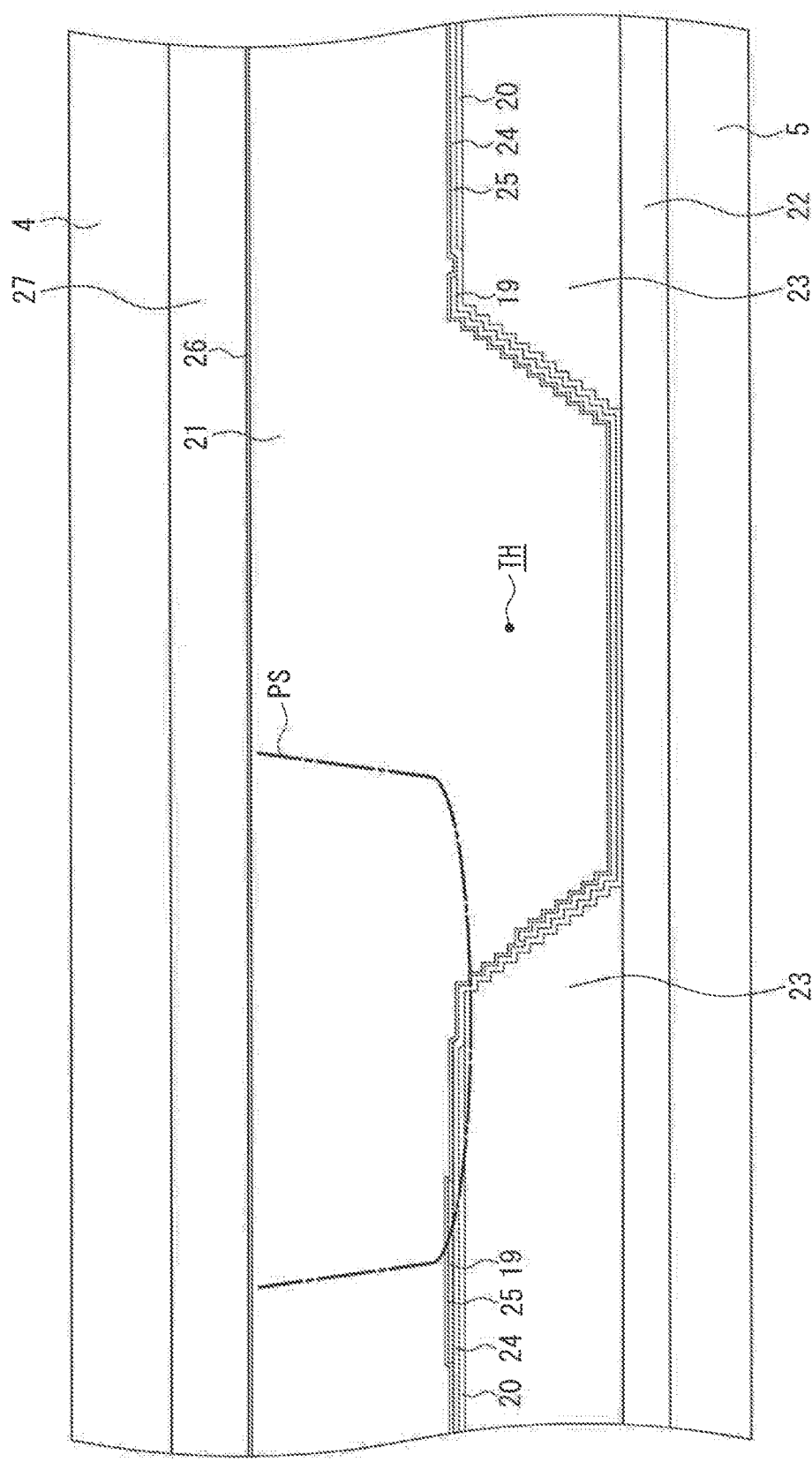
FIG. 4 is a cross-sectional view taken along the line IV-IV shown in FIG. 3.

In FIG. 4, the common electrode 20 is provided between the second insulating film 23 and a third insulating film 24. The common electrode 20 is provided so as to be shared by all of the pixels P and also, as shown in FIG. 3, in the common electrode 20, an opening 20a corresponding to the through hole TH is formed for each pixel. Also, for the common electrode 20, for example, a transparent electrode material is used such as, for example, ITO or IZO. Furthermore, the common electrode 20 is connected to a common interconnect line (not shown) that is formed, using the same material, in the same layer as, for example, the gate interconnect lines G.

The third insulating film 24 constitutes an interlayer insulating layer, and the common electrode 20 and the pixel electrode 19 are provided so as to oppose each other with the third insulating film 24 interposed therebetween. Also, for the third insulating film 24, for example, silicon nitride (SiNx), silicon oxide ($SiO_2$), or the like is used.

In FIG. 4, the pixel electrodes 19 are formed on the third inorganic insulating film 24. For the pixel electrodes 19, a transparent electrode material such as, for example, ITO or IZO is used.

Also, as shown in FIG. 3, each pixel electrode 19 includes a base portion 19a, a linear portion 19b that is provided in parallel to the gate interconnect lines G, a plurality of (for example, two) comb-tooth portions 19c that are provided between the base portion 19a and the linear portion 19b and are provided in parallel to each other so as to form a slit, and a contact portion 19d that is connected to the drain electrode (not shown) of the thin film transistor 18 within the through hole TH.

Also, the liquid crystal display device 1 according to the present embodiment is a fringe field switching (FFS) mode liquid crystal display device, and, for example, a horizontal electric field liquid crystal panel 2 including horizontal alignment mode pixels P is used. To be specific, a horizontal alignment film 25 is provided on an inner surface of the active matrix substrate 5, a horizontal alignment film 26 is provided on an inner surface of the counter substrate 4, and a liquid crystal layer 21 containing liquid crystal molecules (not shown) with positive dielectric anisotropy is provided between the horizontal alignment films 25 and 26.

For the horizontal alignment films 25 and 26, for example, polyimide or the like is used, and in order to regulate the alignment of liquid crystal molecules contained in the liquid crystal layer 21, the horizontal alignment films 25 and 26 are subjected to alignment processing such as rubbing or photo alignment processing.

On the counter substrate 4, RGB color filter layers corresponding to R, G and B pixels and a black matrix that divides the RGB color filter layers are provided (not shown). Also, on the liquid crystal layer 21 side of the counter substrate 4 on which the color filter layers and the black matrix are provided, an overcoat layer 27 (FIG. 4) that serves as a planarization layer is provided.

In the liquid crystal display device 1 according to the present embodiment, based on a switching operation of the thin film transistor 18, fringing electric fields are formed between the common electrode 20 and the pixel electrode 19 so as to pass through the comb-tooth portions 19c of the pixel electrode 19, and the alignment of the liquid crystal molecules contained in the liquid crystal layer 21 is controlled by the fringing electric fields.

Also, in the liquid crystal display device 1 according to the present embodiment, as indicated by a thick line in FIG. 3, a photo spacer PS that serves as a spacer is disposed so as to extend across four pixel regions PA. As indicated by a dash dot line in FIG. 4, the photo spacer PS is provided inside the liquid crystal layer 21 between the counter substrate 4 and the active matrix substrate 5 so as to provide a constant spacing between the counter substrate 4 and the active matrix substrate 5.

Also, as shown in FIG. 3, the photo spacer PS is configured to have a pillar shape whose cross section has, for example, a square shape, the cross section being taken along the same plane as the pixel electrode 19.

For the photo spacer PS, for example, a phenolic novolac photosensitive resin is used. To be specific, the photo spacer PS is formed to have a predetermined shape at an intended position by applying the photosensitive resin over the counter substrate 4 with the use of, for example, a spin coating method, exposing the applied photosensitive resin via a photomask, and then developing the same.

Also, inside the photo spacer PS, equipotential lines having a voltage less than a threshold value are formed. To be specific, in the liquid crystal display device 1 according to the present embodiment, in each photo spacer PS, as shown in FIGS. 3 and 4, a pixel electrode 19 absent pattern (or in other words, a portion in which the pixel electrode 19 is not formed) that overlaps the photo spacer PS is provided so as to extend from a side surface of the through hole TH to a position on the third insulating film (interlayer insulating layer) 24. Accordingly, in the liquid crystal display device 1 according to the present embodiment, equipotential lines having a voltage less than a threshold value, for example, equipotential lines having a voltage less than 1.5 V are formed inside the photo spacer PS, and it is therefore possible to reduce a parasitic capacitance on the photo spacer PS and prevent the occurrence of a white spot while implementing a high resolution (a detail thereof will be described later).

Figure 5:
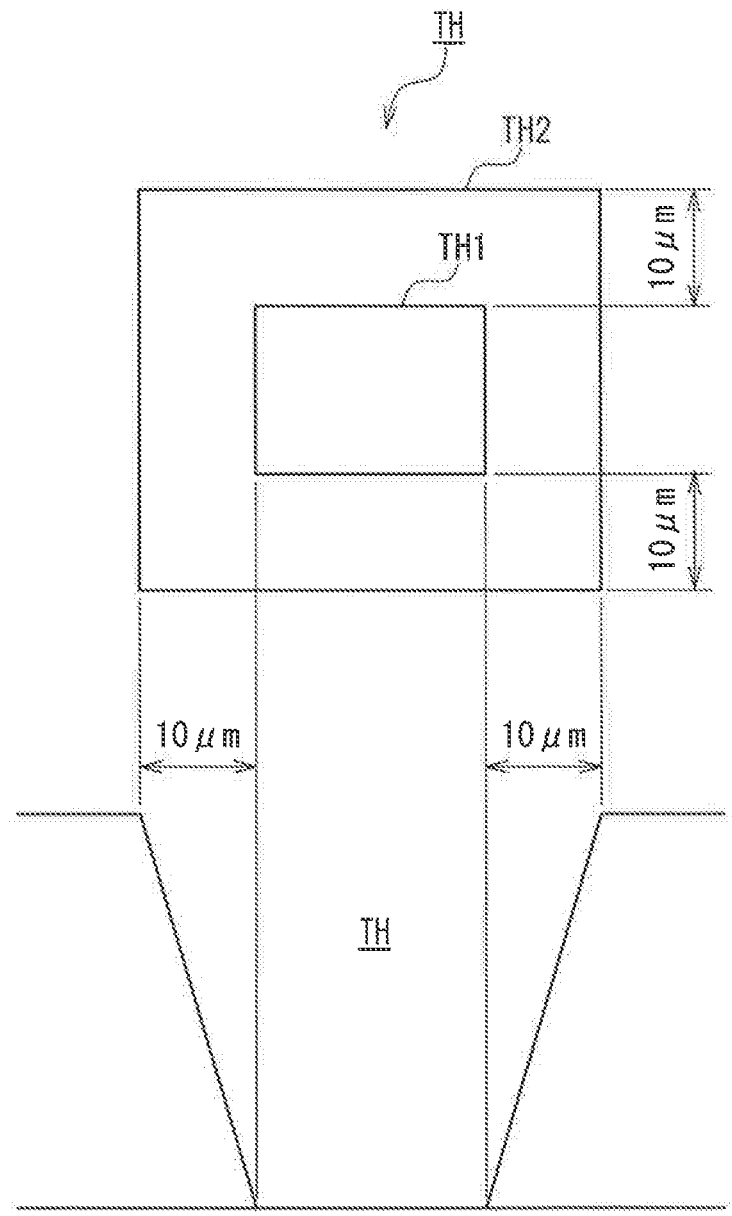
FIG. 5 is a diagram illustrating a specific configuration of a through hole shown in FIG. 4.

As shown in FIG. 5, the through hole TH is configured to include a rectangular bottom surface TH1 and an upper opening portion TH2 having a rectangular opening. As shown in FIG. 3, in the through hole TH, the bottom surface TH1 is provided so as to surround the contact portion 19d of the pixel electrode 19. As shown in FIG. 5, the opening dimension of the opening portion TH2 is set with respect to the bottom surface TH1, and thus the contact portion 19d can be appropriately connected to the drain electrode of the thin film transistor. In FIG. 3, the opening portion TH2 is not illustrated.

Here, a result of simulation as to whether or not a white spot occurs on the liquid crystal display device 1 according to the present embodiment will be described specifically with reference to FIGS. 6 to 10.

Figure 6:
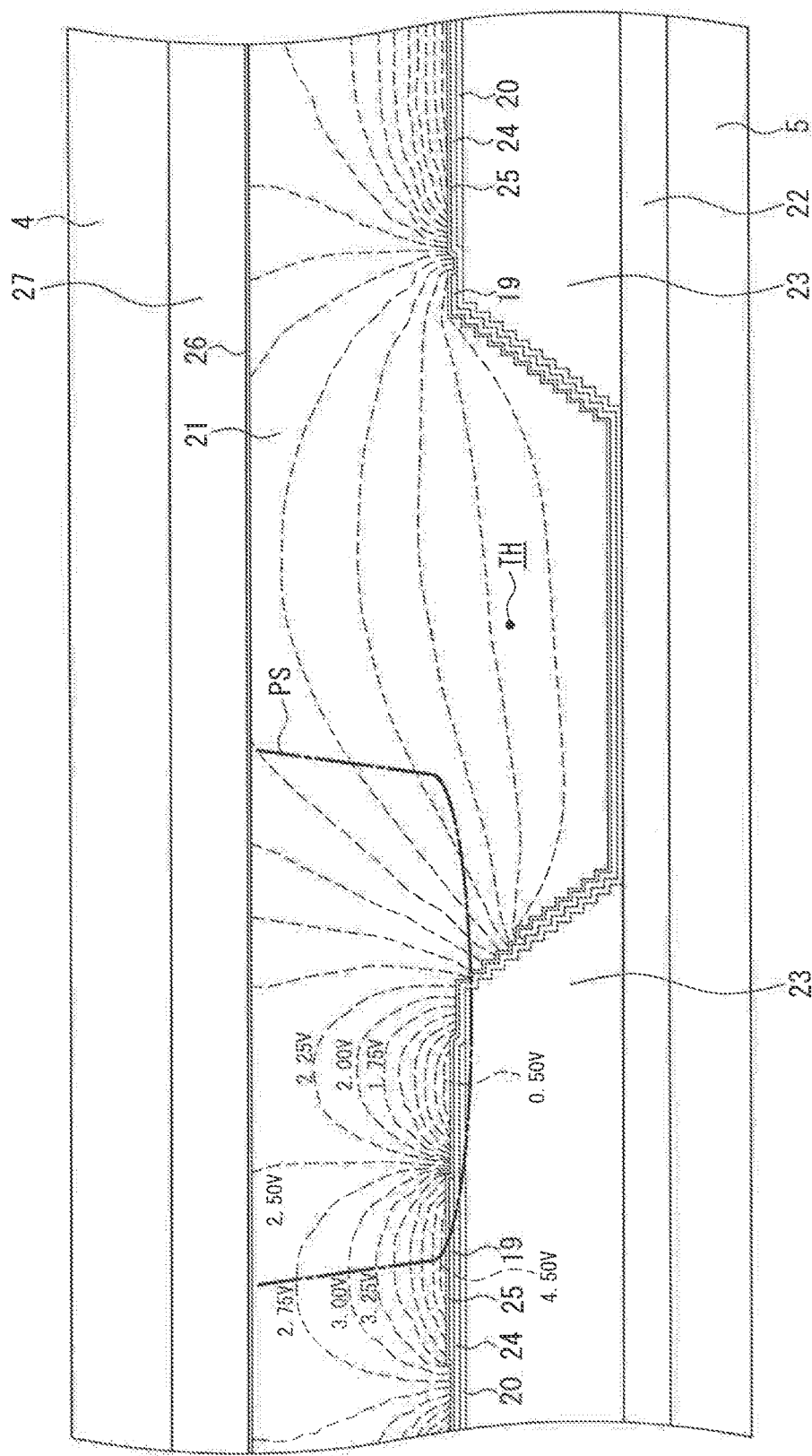
FIG. 6 is a cross sectional view showing a result of simulation performed on a product according to the present embodiment.
Figure 7:
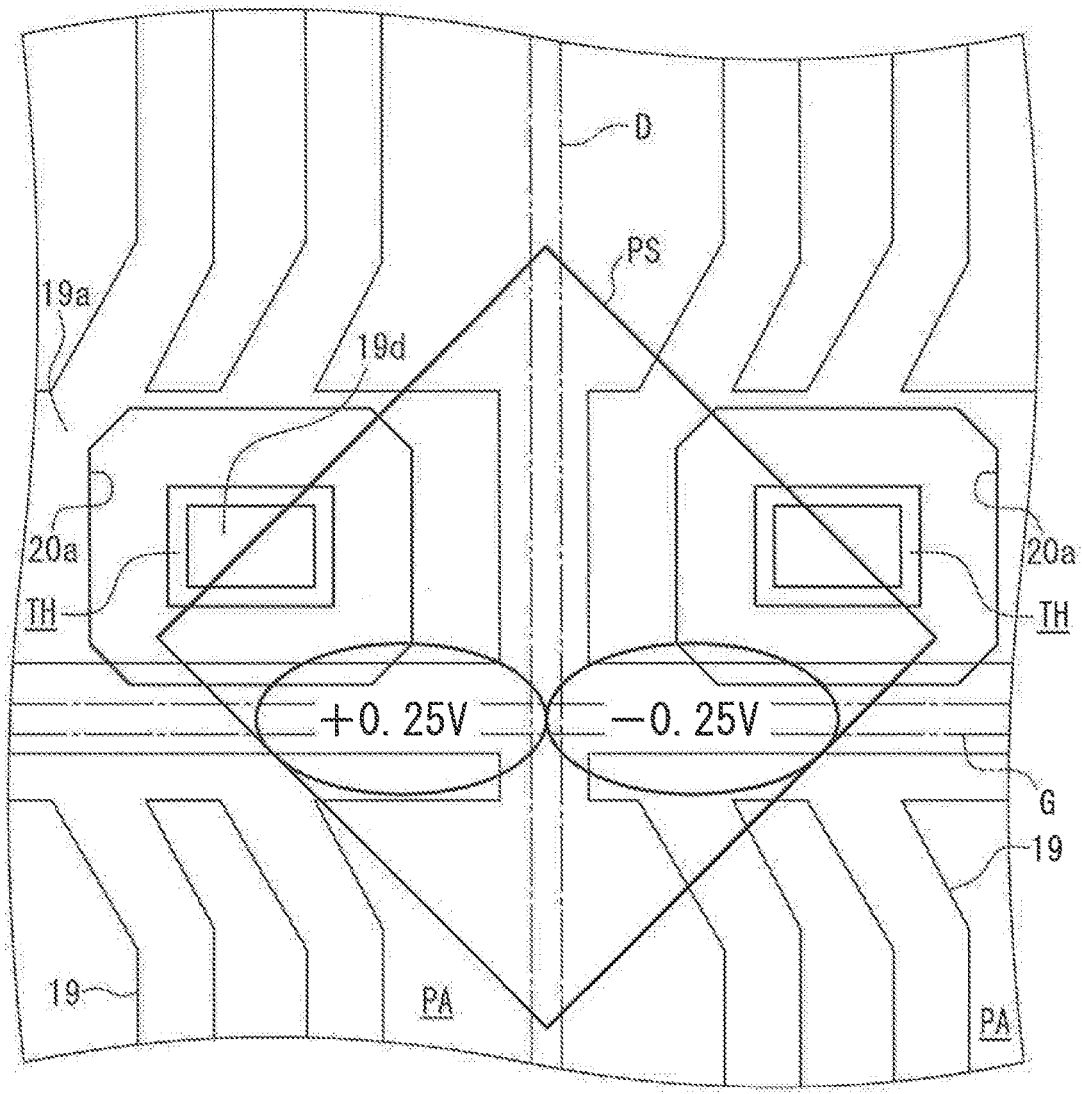
FIG. 7 is a plan view showing the result of simulation shown in FIG. 6.
Figure 8:
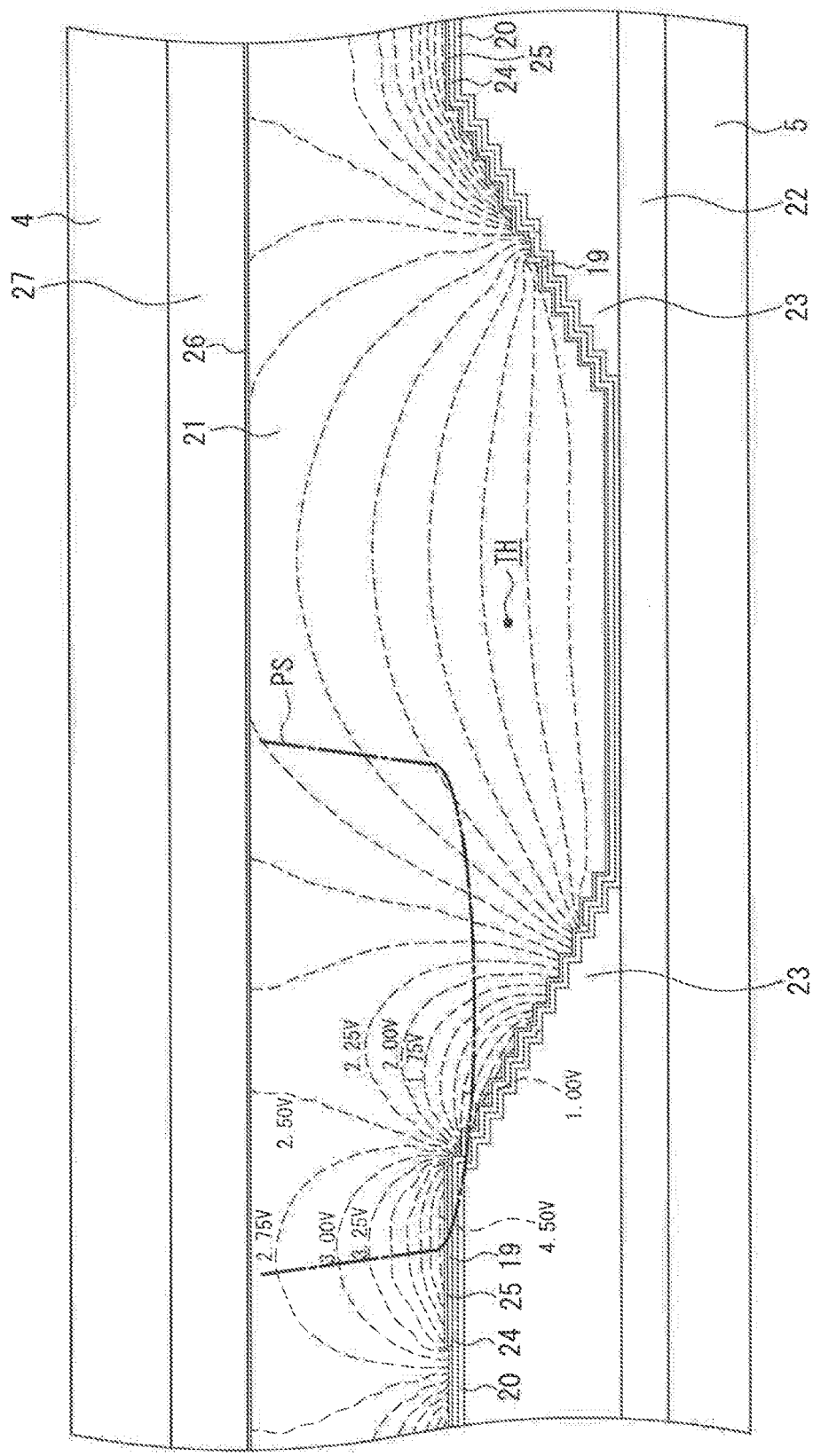
FIG. 8 is a cross sectional view showing a result of simulation performed on a comparative product.
Figure 9:
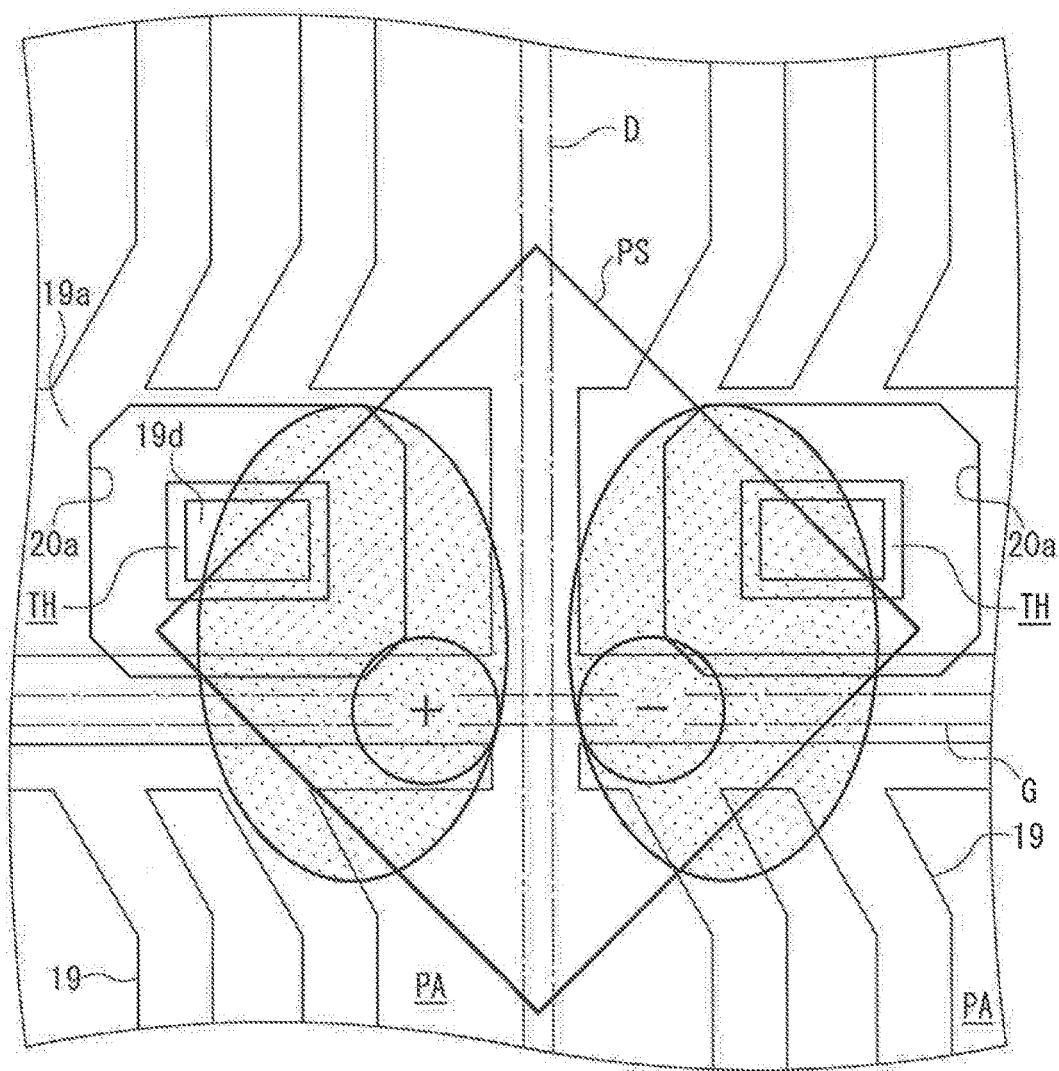
FIG. 9 is a plan view showing the result of simulation shown in FIG. 8.
Figure 10:
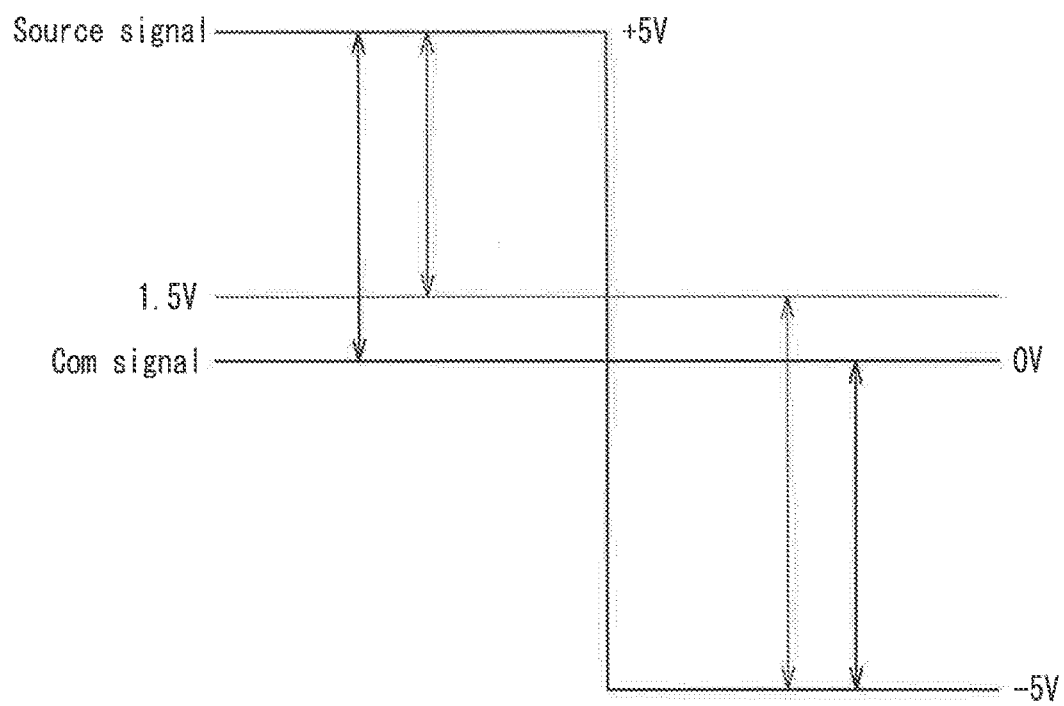
FIG. 10 is a graph showing a result of another simulation performed on the product according to the present embodiment.

FIG. 6 is a cross sectional view showing a result of simulation performed on a product according to the present embodiment. FIG. 7 is a plan view showing the result of simulation shown in FIG. 6. FIG. 8 is a cross sectional view showing a result of simulation performed on a comparative product. FIG. 9 is a plan view showing the result of simulation shown in FIG. 8. FIG. 10 is a graph showing a result of another simulation performed on the product according to the present embodiment. FIGS. 6 and 8 are a cross sectional view of a product according to the present embodiment and a cross sectional view of a comparative product that are taken at the same position as the section line shown in FIG. 3.

In this simulation, in a product according to the present embodiment, the pitch P1 and the pitch P2 shown in FIG. 3 are set to 47.25 μm and 15.75 μm, respectively. That is, in the product according to the present embodiment, a higher resolution is implemented as compared to a conventional equivalent product having, for example, a pitch P1 of about 90.75 μm and a pitch P2 of about 30.25 μm.

Also, in the simulation, as the counter substrate 4 and the active matrix substrate 5, glass plates having a thickness of 0.5 mm are used. Also, as the color filter layer, the overcoat layer 27, and the alignment film 26 provided on the counter substrate 4 side, a resin film having a thickness of 1.8 μm, a resin film having a thickness of 1.5 μm, and a polyimide film having a thickness of 0.1 μm are used, respectively. Also, as the liquid crystal layer 21, a 3.0 μm-thick liquid crystal layer containing liquid crystal molecules with positive dielectric anisotropy is used. Also, as the alignment film 25, the pixel electrode 19, the third insulating film (interlayer insulating layer) 24, the common electrode 20, and the first and second insulating films 22 and 23 provided on the active matrix substrate 5 side, a polyimide film having a thickness of 0.1 μm, an ITO film having a thickness of 0.07 μm, a SiN film having a thickness of 0.1 μm, an ITO film having a thickness of 0.07 μm, and SiN films having a thickness of 0.4 μm are used, respectively.

Also, in the simulation, a voltage of ±5 V is applied to the pixel electrode 19, and a voltage of ±0 V is applied to the common electrode 20.

Furthermore, in the simulation, in the photo spacer PS of the product according to the present embodiment, as shown in FIGS. 3 and 4, a pixel electrode 19 absent pattern (or in other words, a portion in which the pixel electrode 19 is not formed) that overlaps the photo spacer PS is provided so as to extend from a side surface of the through hole TH to a position on the third insulating film (interlayer insulating layer) 24.

On the other hand, as a comparative product, as shown in FIG. 8, which will be described later, the pixel electrode 19 absent pattern that overlaps the photo spacer PS is provided mainly on a side surface of the through hole TH.

In the product according to the present embodiment, as shown in FIG. 6, equipotential lines are formed above the second insulating film 23, or in other words, in an area corresponding to the pixel electrode 19 absent pattern that overlaps the photo spacer PS, rather than the side surface of the through hole TH. On the other hand, in the comparative product, as shown in FIG. 8, equipotential lines are formed in a portion corresponding to the side surface of the through hole TH.

Also, in the product according to the present embodiment, as indicated by an oval shape with +0.25 V and an oval shape with −0.25 V shown in FIG. 7, the inside of the photo spacer PS was mostly covered with equipotential lines having a low voltage. That is, even an area inside the photo spacer PS other than the areas indicated by the oval shape with +0.25 V and the oval shape with −0.25 V was covered with equipotential lines having a voltage less than ±0.25 V. Accordingly, in the product according to the present embodiment, a parasitic capacitance on the photo spacer PS was reduced, and even when the liquid crystal display device 1 was energized for a long period of time, the charge (charge accumulation) on the photo spacer PS was small, and the occurrence of a white spot was prevented.

On the other hand, in the comparative product, as indicted by an oval shape with a positive (+) sign and an oval shape with a negative (−) sign in FIG. 8, the inside of the photo spacer PS was mostly covered with equipotential lines having a high voltage, to be specific, with equipotential lines having a high voltage of ±1.5 V or more and ±4.5 V or less. Accordingly, in the comparative product, a parasitic capacitance on the photo spacer PS was not reduced, and when the liquid crystal display device 1 was energized for a long period of time, the charge (charge accumulation) on the photo spacer PS was large, and a white spot occurred.

Also, the inventors of the present invention have found that a white spot can be eliminated even when a white spot occurs in the actual product of the liquid crystal display device 1 by subjecting the actual product of the liquid crystal display device 1 to anneal processing at a temperature of for example, 70° C. for about 6 hours. From this finding, it was confirmed that a white spot is caused by "charge up" into the inside of the liquid crystal panel 2, in particular, the inside of the photo spacer PS.

Also, according to another simulation conducted by the inventors of the present invention, it was found that the voltage of Com signal (common signal) supplied to the common electrode 20 varies according to the voltage of equipotential lines in the photo spacer PS. That is, as shown in FIG. 10, when the Com signal is set to 0 V, a voltage of ±5 V is applied to the source signal and thus the voltage applied to the liquid crystal layer 21 has the same magnitude at the positive polarity and the negative polarity, and the Com potential (common signal voltage) obtained at this time is referred to as optimum Vcom. Also, for example, if only an ionic substance having the positive polarity flows out of one of the films in the liquid crystal panel 2 into the liquid crystal layer 21, the voltage applied to the liquid crystal layer 21 varies at the positive polarity and the negative polarity, and the optimum Vcom is shifted.

Then, according to another simulation conducted by the inventors of the present invention, it was found that, when the equipotential lines in the photo spacer PS have a voltage less than 1.5 V (or in other words, a voltage less than a threshold value), the amount of shift of the optimum Vcom is small, and the charge into the inside of the photo spacer PS is suppressed, and a white spot does not occur.

It was found, on the other hand, when the equipotential lines in the photo spacer PS have a voltage greater than or equal to 1.5 V, the amount of shift of the optimum Vcom is large, and the charge into the inside of the photo spacer PS cannot be suppressed, and thus a white spot occurs.

That is, for example, as shown in FIG. 10, it has been proved that a white spot does not occur when the Com signal is shifted by an amount corresponding to a voltage less than 1.5 V. On the other hand, when the Com signal is shifted by an amount corresponding to a voltage greater than or equal to 1.5 V, a white spot occurs due to the inside of the photo spacer PS being charged up.

In the liquid crystal display device 1 according to the present embodiment configured as described above, the photo spacer PS is provided inside the liquid crystal layer 21. Furthermore, equipotential lines having a voltage less than a threshold value are formed inside the photo spacer PS. Accordingly in the liquid crystal display device 1 according to the present embodiment, unlike the conventional liquid crystal display device described above, it is possible to reduce a parasitic capacitance on the photo spacer PS and prevent the occurrence of a white spot while implementing a high resolution.

Also, in the present embodiment, in the photo spacer PS, the pixel electrode 19 absent pattern that overlaps the photo spacer PS is provided so as to extend from a side surface of the through hole TH to a position on the third insulating film (interlayer insulating layer) 24, and thus the equipotential lines having a voltage less than a threshold value are formed inside the photo spacer PS. As a result, in the present embodiment, it is possible to reliably set the equipotential lines in the photo spacer PS to a voltage less than a threshold value.

Also, in the present embodiment, on the active matrix substrate (one of a pair of substrates), a plurality of gate interconnect lines G and a plurality of data interconnect lines D are provided in a matrix, and a pixel region PA is provided that is defined by two adjacent gate interconnect lines G and two adjacent data interconnect lines D and in which a thin film transistor (switching element) 18, a through hole TH, and a pixel electrode 19 are disposed. Also, a photo spacer PS is disposed inside the liquid crystal layer 21 so as to extend across four pixel regions PA. With this configuration, in the present embodiment, the spacing between the counter substrate 4 and the active matrix substrate 5 can be appropriately maintained by a plurality of photo spacers PS.

Also, in the present embodiment, the pitch between two adjacent gate interconnect lines G is set to a value within a range of 30 to 90 μm, and the pitch between two adjacent data interconnect lines D is set to a value within a range of 10 to 30 μm. Accordingly, in the present embodiment, it is possible to easily configured a liquid crystal display device 1 in which a high resolution is implemented.

Second Embodiment

Figure 11:
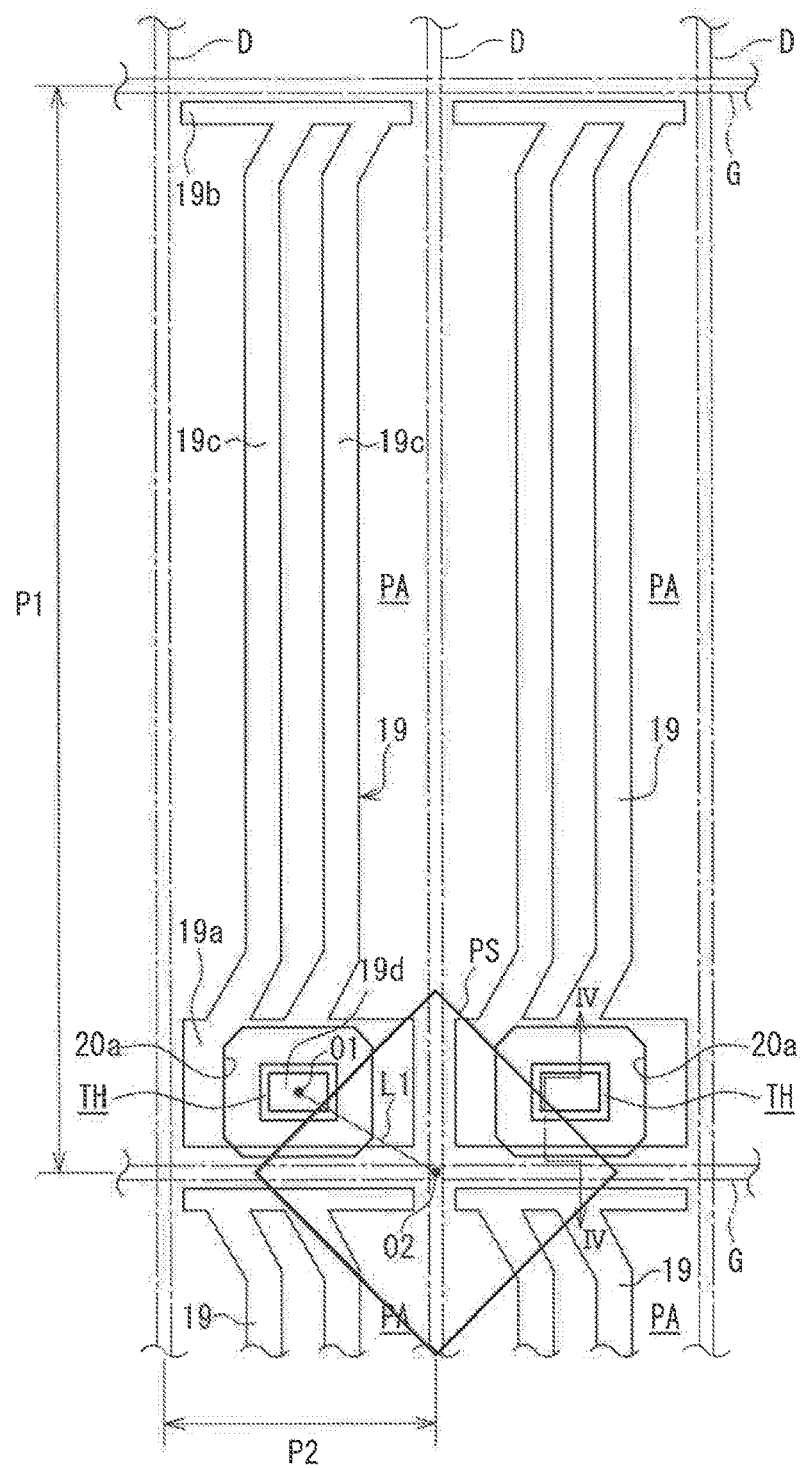
FIG. 11 is a plan view illustrating an essential part of a liquid crystal display device according to a second embodiment of the present invention.

FIG. 11 is a plan view illustrating an essential part of a liquid crystal display device according to a second embodiment of the present invention.

In the diagram, the present embodiment is different from the first embodiment given above primarily in that the distance between the center of the photo spacer and the center of the through hole is set to a predetermined distance or more. Elements that are common to those of the first embodiment described above are given the same reference numerals, and a redundant description will be omitted.

That is, as shown in FIG. 11, in the liquid crystal display device 1 according to the present embodiment, a distance L1 between a center O1 of the through hole and a center O2 of the photo spacer PS is set to a predetermined distance or more. To be specific, the distance L1 is set to, for example, 12.4 μm or more.

Also, in the present embodiment, as in the first embodiment, the photo spacer PS is configured such that, a pixel electrode 19 absent pattern that overlaps the photo spacer PS is provided so as to extend from a side surface of the through hole TH to a position on the third insulating film 24, and thus equipotential lines having a voltage less than a threshold value are formed in the photo spacer PS.

In other words, in the present embodiment, the distance L1 is set to a distance that is a predetermined distance or more and at which equipotential lines having a voltage less than a threshold value are formed in the photo spacer PS.

With the configuration described above, the present embodiment can produce the same operations and effects as those of the first embodiment given above.

Also, in the present embodiment, the distance L1 between the center O1 of the through hole and the center O2 of the photo spacer PS is set to a predetermined distance or more, and thus the photo spacer PS is spaced apart from the through hole TH that is an electrical connection area between the thin film transistor 18 and the pixel electrode 19 by a predetermined distance or more, and it is therefore possible to more reliably set the equipotential lines formed inside the photo spacer PS to a voltage less than a threshold value.

Third Embodiment

Figure 12:
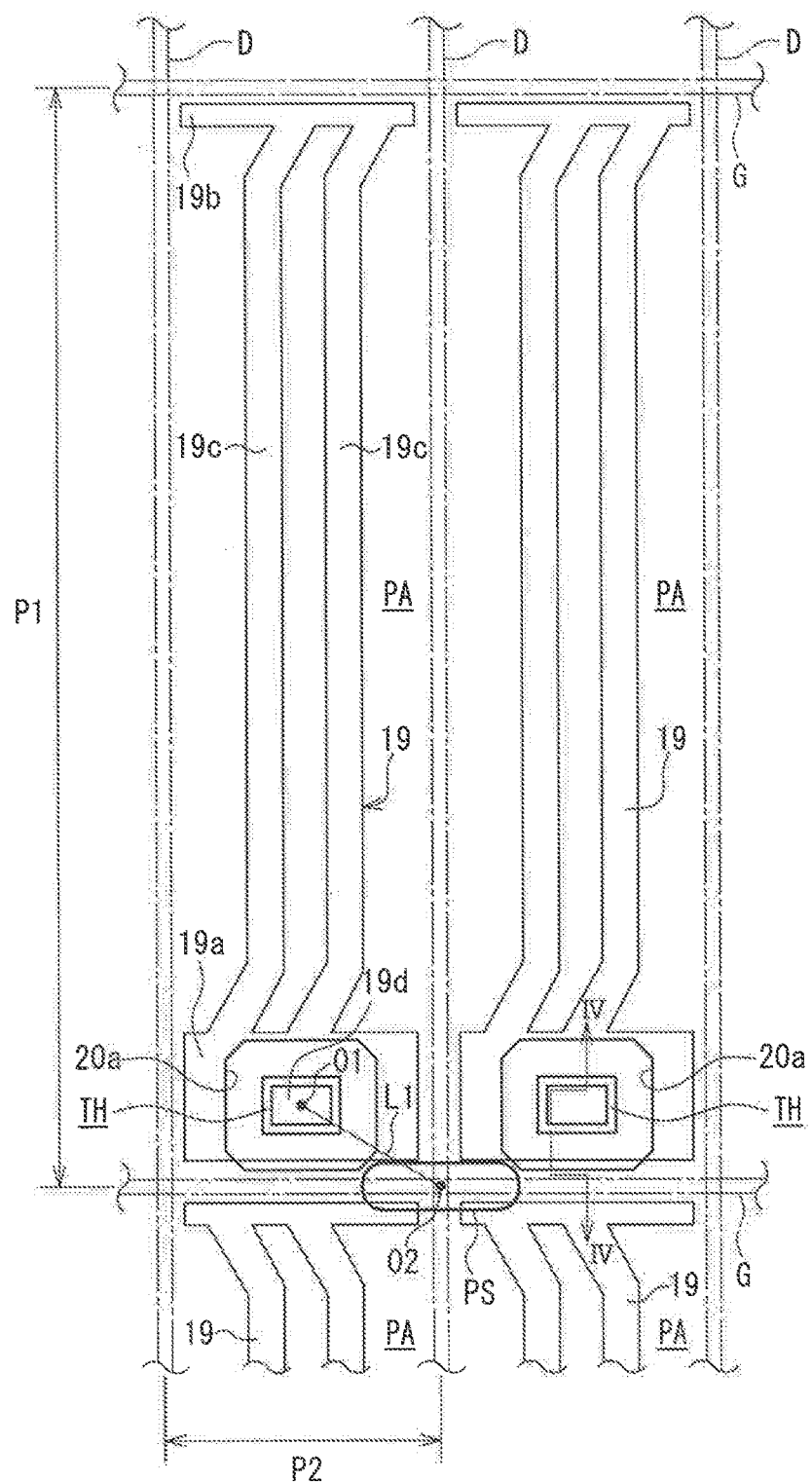
FIG. 12 is a plan view illustrating an essential part of a liquid crystal display device according to a third embodiment of the present invention.

FIG. 12 is a plan view illustrating an essential part of a liquid crystal display device according to a third embodiment of the present invention.

In the diagram, the present embodiment is different from the first embodiment given above primarily in that the photo spacer is configured to have a shape that does not overlap the through hole. Elements that are common to those of the first embodiment described above are given the same reference numerals, and a redundant description will be omitted.

That is, as shown in FIG. 12, in the liquid crystal display device 1 according to the present embodiment, the photo spacer PS is configured to have a pillar shape whose cross section has, for example, an oval shape, the cross section being taken along the same plane as the pixel electrode 19, and the photo spacer PS is disposed so as to not overlap the through hole TH.

With the configuration described above, the present embodiment can produce the same operations and effects as those of the first embodiment given above.

Also, in the present embodiment, the photo spacer PS is configured to have a shape that does not overlap the through hole TH, and it is therefore possible to more reliably set the equipotential lines formed inside the photo spacer PS to a voltage less than a threshold value.

The embodiments given above are to be considered in all respects as illustrative and not limiting. The technical scope of the present invention is indicated by the appended claims, and all changes which come within the structural elements and the meaning and range of equivalency of the claims are intended to be embraced therein.

For example, the foregoing description has been given by taking an example in which the present invention is applied to a transmissive liquid crystal display device, but the liquid crystal display device according to the present invention is not limited thereto, and may be applied to a semi-transmissive or reflective liquid crystal display device.

Also, the foregoing description has been given by taking an example in which a voltage of less than 1.5 V is used as the voltage less than a threshold value, but the present invention is not limited thereto. The voltage less than a threshold value refers to, in the case where a voltage is applied to the liquid crystal layer, a voltage at which a parasitic capacitance on the (photo) spacer is reduced and a white spot caused by the charge on the spacer does not occur, and it is sufficient that equipotential lines having a voltage less than or equal to equipotential lines having this voltage (voltage less than a threshold value) is formed inside the spacer.

Also, in the foregoing description, a configuration was described in which data interconnect lines are respectively provided for red (R), green (G) and blue (B) pixels, but the present invention is not limited thereto. It is possible to use a configuration in which, for example, R, G and B pixels are sequentially provided for each data interconnect line.

Also, in the foregoing description, an example was described in which thin film transistors are used as the first to third switching elements, but the switching elements according to the present invention are not limited thereto, and it is also possible to use, for example, field-effect transistors.

The present invention may also encompass combinations obtained by combining the first to third embodiments as appropriate, in addition to the foregoing description.

INDUSTRIAL APPLICABILITY

The present invention is useful as a liquid crystal display device that has high display quality and can prevent the occurrence of a white spot while implementing a high resolution.

DESCRIPTION OF REFERENCE SIGNS

1 Liquid crystal display device
4 Counter substrate (a pair of substrates)
5 Active matrix substrate (one of the pair of substrates)
18 Thin film transistor (switching element)
19 Pixel electrode
20 Common electrode
21 Liquid crystal layer
24 Third insulating film (interlayer insulating layer)
D, D1 to DM Data interconnect line
G, G1 to GN Gate interconnect line
TH Through hole
PS Photo spacer (spacer)
PA Pixel region

The invention claimed is:

1. A liquid crystal display device comprising a pair of substrates and a liquid crystal layer that is provided between the pair of substrates,
   wherein one of the pair of substrates includes gate interconnect lines, data interconnect lines, a switching element, a pixel electrode that is connected to the switching element via a through hole, a common electrode, and an interlayer insulating layer that is disposed between the pixel electrode and the common electrode,
   a spacer for providing a constant spacing between the pair of substrates is provided inside the liquid crystal layer, and
   equipotential lines having a voltage less than a threshold value are formed inside the spacer.

2. The liquid crystal display device according to claim 1, wherein in the spacer, a pixel electrode absent pattern in which the pixel electrode is not provided and that overlaps the spacer is disposed so as to extend from a side surface of the through hole to a position on the interlayer insulating layer, and the equipotential lines having a voltage less than a threshold value are thereby formed inside the spacer.

3. The liquid crystal display device according to claim 1, wherein a predetermined distance or more is set between a center of the spacer and a center of the through hole.

4. The liquid crystal display device according to claim 1, wherein the spacer is configured to have a shape that does not overlap the through hole.

5. The liquid crystal display device according to claim 1, wherein one of the pair of substrates is configured such that the plurality of gate interconnect lines and the plurality of data interconnect lines are arranged in a matrix, and a pixel region is provided that is defined by two adjacent ones of the gate interconnect lines and two adjacent ones of the data interconnect lines and in which the switching element, the through hole, and the pixel electrode are disposed, and
   the spacer is disposed inside the liquid crystal layer so as to extend across four pixel regions, each being said pixel region.

6. The liquid crystal display device according to claim 1, wherein a pitch between two adjacent ones of the gate interconnect lines is set to a value within a range of 30 to 90 μm, and
   a pitch between two adjacent ones of the data interconnect lines is set to a value within a range of 10 to 30 μm.

* * * * *